United States Patent
Allen, Jr. et al.

(10) Patent No.: US 7,130,769 B1
(45) Date of Patent: Oct. 31, 2006

(54) METHOD OF DYNAMICALLY DESIGNING A PREVENTATIVE MAINTENANCE SCHEDULE BASED UPON SENSOR DATA, AND SYSTEM FOR ACCOMPLISHING SAME

(75) Inventors: Sam H. Allen, Jr., New Braunfels, TX (US); Michael R. Conboy, Austin, TX (US); Elfido Coss, Jr., Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 870 days.

(21) Appl. No.: 10/060,877

(22) Filed: Jan. 30, 2002

(51) Int. Cl.
*G06F 15/00* (2006.01)

(52) U.S. Cl. ............ 702/184; 702/113; 702/114; 702/119; 702/122; 702/123; 702/155; 700/99

(58) Field of Classification Search ............ 702/184, 702/113, 114, 119, 122, 123, 155; 700/99, 700/100, 108–110
See application file for complete search history.

(56) References Cited

U.S. PATENT DOCUMENTS 5,661,669 A * 8/1997 Mozumder et al. ......... 702/84
5,999,886 A * 12/1999 Martin et al. ............... 702/31
6,326,758 B1 * 12/2001 Discenzo .................... 318/609
2002/0156542 A1 * 10/2002 Nandi ......................... 700/30

* cited by examiner

*Primary Examiner*—Marc S. Hoff
*Assistant Examiner*—Phuong Huynh
(74) *Attorney, Agent, or Firm*—Williams, Morgan & Amerson, P.C.

(57) ABSTRACT

In one example, the method includes operating a process tool that has a plurality of sensors for sensing at least one parameter associated with the operation of the process tool, obtaining data from the sensors and determining at least one maintenance activity for the process tool based upon the data obtained from the sensors. In another example, data from the sensors is provided to a controller that analyzes the data and indicates desired variations in at least one maintenance activity to be performed on the process tool based upon the analysis of the data. In yet another example, the controller identifies a plurality of maintenance activities to be performed on the process tool based upon the analysis of the data.

28 Claims, 1 Drawing Sheet

METHOD OF DYNAMICALLY DESIGNING A PREVENTATIVE MAINTENANCE SCHEDULE BASED UPON SENSOR DATA, AND SYSTEM FOR ACCOMPLISHING SAME

BACKGROUND OF THE INVENTION

1. Field of the Invention

This invention relates generally to the field of semiconductor device manufacturing and, more particularly, to a method of dynamically designing a preventative maintenance schedule based upon sensor data, and a system for accomplishing same.

2. Description of the Related Art

There is a constant drive within the semiconductor industry to increase the quality, reliability and throughput of integrated circuit devices, e.g., microprocessors, memory devices, and the like. This drive is fueled by consumer demands for higher quality computers and electronic devices that operate more reliably. These demands have resulted in a continual improvement in the manufacture of semiconductor devices, e.g., transistors, as well as in the manufacture of integrated circuit devices incorporating such transistors. Additionally, reducing the defects in the manufacture of the components of a typical transistor also lowers the overall cost per transistor as well as the cost of integrated circuit devices incorporating such transistors.

Semiconductor devices are manufactured from wafers comprised of a semiconducting material. Layers of materials are added, removed, and/or treated during fabrication to create the electrical circuits that make up the device. The fabrication essentially comprises four basic operations. Although there are only four basic operations, they can be combined in hundreds of different ways, depending upon the particular fabrication process.

Four operations typically used in the manufacture of semiconductor devices are:

layering, or adding thin layers of various materials to a wafer from which a semiconductor device is produced;

patterning, or removing selected portions of added layers;

doping, or placing specific amounts of dopants in the wafer surface through openings in the added layers; and heat treatment, or heating and cooling the materials to produce desired effects in the processed wafer.

The technologies underlying semiconductor processing tools have attracted increased attention over the last several years, resulting in substantial refinements. However, despite the advances made in this area, many of the processing tools that are currently commercially available suffer certain deficiencies. In particular, such tools often lack advanced process data monitoring capabilities, such as the ability to provide historical parametric data in a user-friendly format, as well as event logging, real-time graphical display of both current processing parameters and the processing parameters of the entire run, and remote, i.e., local site and worldwide, monitoring. These deficiencies can engender nonoptimal control of critical processing parameters, such as throughput, accuracy, stability and repeatability, processing temperatures, mechanical tool parameters, and the like. This variability manifests itself as within-run disparities, run-to-run disparities and tool-to-tool disparities that can propagate into deviations in product quality and performance, whereas an ideal monitoring and diagnostics system for such tools would provide a means of monitoring this variability, as well as providing means for optimizing control of critical parameters.

Most modern integrated circuit device manufacturing facilities make great efforts in attempting to control the various process operations performed in manufacturing integrated circuit devices. Such efforts typically involve the collection of large amounts of data from a variety of sensors employed in the fabrication facility. These sensors may be integrated within the various processing tools, or they may be part of various offline metrology tools. The data for such sensors may be collected on a routine or random basis. At least some of the data obtained by the sensors is typically stored, at least for some period of time, in one or more databases. Some of the data collected may not be stored for any significant duration. For example, collected data that indicates that the monitored process is performing within an acceptable operating range may be discarded after a period of time.

A variety of different types of process tools are employed in the manufacture of integrated circuits. Examples of such tools are deposition tools, etching tools, ion implant tools, chemical mechanical polishing tools, furnaces, rapid thermal anneal chambers, etc. These types of tools perform, in some cases, very complex and important process operations. Moreover, the tools themselves are very complex pieces of equipment that must be properly maintained so that they can continue to produce the desired results during operation. Accordingly, a preventative maintenance program is normally established for the tools. The preventative maintenance program often involves checking a great number of operating aspects of the process tool. Preventative maintenance programs are typically standardized in the sense that all tools of the same type, e.g., a particular manufacturer's deposition tool, will be subjected to the same type of preventative maintenance procedures. In many cases, the tool manufacturer specifies the precise preventative maintenance procedures to be performed on the tool. Such preventative maintenance, while desirable in one respect, can be very time-consuming to complete. While such tools are down for preventative maintenance care, the overall efficiency of the fabrication facility may suffer. What is desirable is a method and system for performing an appropriate degree of preventative maintenance on the process tools without having excessive down-time for the tools during the preventative maintenance program.

The present invention is directed to overcoming, or at least reducing the effects of, one or more of the problems set forth above.

SUMMARY OF THE INVENTION

The present invention is generally directed to a method of dynamically designing preventative maintenance activities and schedules based upon sensor data, and a system for accomplishing same. In one illustrative embodiment, the method comprises operating a process tool, the process tool having a plurality of sensors operatively coupled to the process tool for sensing at least one parameter associated with the operation of the process tool, obtaining data from the sensors and determining at least one maintenance activity for the process tool based upon the data sensed by the sensors. In another illustrative embodiment, the method comprises operating a process tool, the process tool having a plurality of sensors operatively coupled to the tool for sensing at least one parameter associated with the operation of the process tool, obtaining data from the sensors, and designing a preventative maintenance program for the process tool based upon the data obtained from the sensors.

In yet another illustrative embodiment, the method comprises operating a process tool, the process tool having a plurality of sensors operatively coupled to the tool for sensing at least one parameter associated with the operation of the process tool, obtaining data from the sensors and providing the data to a controller that analyzes the data obtained from the sensors and indicates desired variations in at least one maintenance activity to be performed on the process tool based upon the analysis of the data.

In yet another illustrative embodiment, the method comprises operating a process tool, the process tool having a plurality of sensors operatively coupled to the tool for sensing at least one parameter associated with the operation of the process tool, obtaining data from the sensors and providing the data to a controller that analyzes the data obtained from the sensors and identifies a plurality of maintenance activities to be performed on the process tool based upon the analysis of the data.

The present invention is also directed to a system for performing one or more of the methods disclosed herein. In one illustrative embodiment, the system comprises a process tool adapted to perform a process operation, a plurality of sensors operatively coupled to the process tool to sense at least one parameter associated with the process operation of the process tool and a controller for analyzing data sensed by the plurality of sensors and determining at least one maintenance activity for the process tool based upon the data sensed by the sensors.

BRIEF DESCRIPTION OF THE DRAWINGS

The invention may be understood by reference to the following description taken in conjunction with the accompanying drawings, in which like reference numerals identify like elements, and in which.

Figure 1:
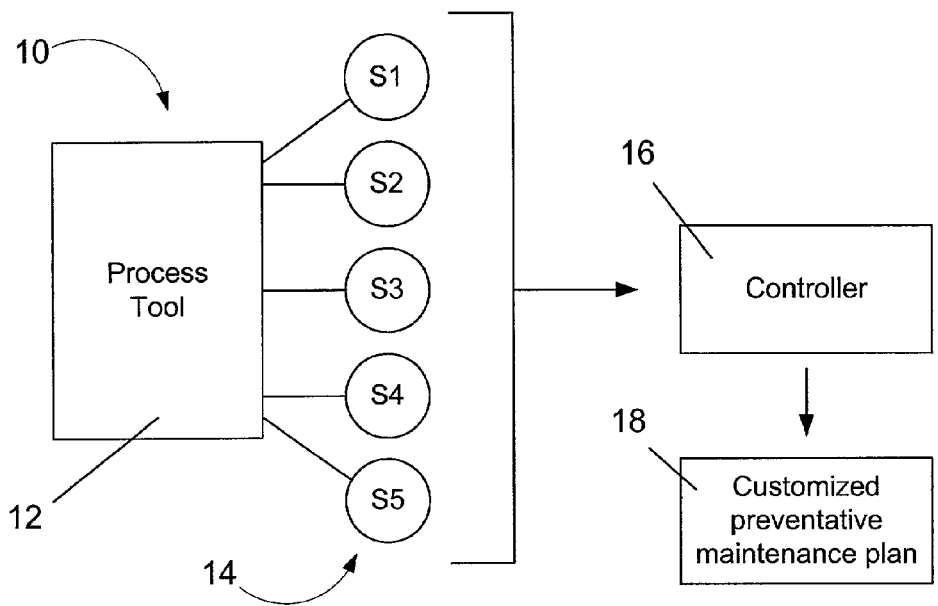
FIG. 1 is a simplified diagram of an illustrative system that may be employed in performing one illustrative embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present invention will now be described with reference to the attached figures. For purposes of clarity, the illustrative system depicted herein does not include all of the supporting utilities and devices of such a system. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

In general, the present invention is directed to various methods of dynamically designing a preventative maintenance schedule based upon sensor data, and a system for accomplishing same. As will be readily apparent to those skilled in the art upon a complete reading of the present application, the present method is applicable to a variety of technologies, e.g., NMOS, PMOS, CMOS, etc., and it is readily applicable to a variety of devices, including, but not limited to, logic devices, memory devices, etc. Moreover, the present invention may be employed with a vast variety of different types of process tools and operations.

FIG. 1 depicts an illustrative system 10 that may be used in performing various illustrative embodiments of the invention disclosed herein. As shown therein, the system 10 is generally comprised of a process tool 12, a plurality of sensors ($S_1$–$S_5$) 14, and a controller 16. The number of sensors depicted in FIG. 1 are depicted by way of example only. As will be recognized by those skilled in the art after a complete reading of the present application, the number of sensors and type of data collected by the sensors 14 may vary greatly depending upon the type of process tool 12 and the nature of the processing operations performed in the process tool 12.

The process tool 12 may be any type of process tool used in the manufacture of integrated circuit devices. For example, the process tool 12 may be a deposition tool, an etching tool, a photolithography module, a stepper, a furnace, a rapid thermal anneal chamber, an ion implant tool, a chemical mechanical polishing tool, etc. Thus, the particular invention should not be considered as limited to any particular type of process tool unless such limitations are expressly recited in the appended claims. Moreover, it should be understood that the present invention may be employed in forming a vast variety of different types of integrated circuit devices.

The sensors 14 may be any type of sensor or metrology tool used for collecting data, and it may collect a variety of different types of data depending on the processing operations performed in the process tool 12. Moreover, the sensors 14 need not be integral with the process tool 12. The sensors 14 may monitor a variety of different parameters or functions of the process tool 12. For example, the sensors 14 may monitor items such as the cleanliness of a process chamber in the process tool 12, the functioning of a valve that controls the amount of one or more process gases introduced into the process tool 12, the temperature and/or pressure in the process chamber, the proper movement of wafers within the process tool by various mechanical systems, the proper repositioning and securement of a wafer at one or more processing locations within the tool, etc. Each of the sensors 14 may be any type of sensors, e.g., a gas flow rate sensor, a temperature sensor, a pressure sensor, an electrical current sensor, an electrical voltage sensor, a vacuum sensor, an optical sensor, etc. Thus, the particular parameters and/or functions sensed by the sensors 14, as well as the type of sensors employed, should not be considered a limitation of the present invention unless such limitations are expressly set forth in the appended claims.

The sensors 14 may be configured and positioned to sense a variety of different types of data as deemed appropriate by the tool manufacturer and/or the responsible process engineer. The data from the sensors 14 may be provided directly to the controller 16, or it may be stored in a database (not shown) which may be accessed by the controller 16 as desired. The controller 16 is adapted to receive or obtain the data sensed by the sensors 14 and take various control actions in response to such data, as described more fully below. In the illustrated embodiment, the controller 16 is a computer programmed with software to implement the functions described. However, as will be appreciated by those of ordinary skill in the art, a hardware controller designed to implement the particular functions may also be used. Moreover, the functions performed by the controller 16, as described herein, may be performed by multiple controller devices distributed throughout a system. Additionally, the controller 16 may be a stand-alone controller, it may be integrated into a tool, such as the process tool 12, or one or more of the sensors 14, or it may be part of a computer system controlling operations in an integrated circuit manufacturing facility.

Portions of the invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

An exemplary software system capable of being adapted to perform the functions of the controller 16, as described, is the Catalyst system offered by KLA-Tencor, Inc. The Catalyst system uses Semiconductor Equipment and Materials International (SEMI) Computer Integrated Manufacturing (CIM) Framework compliant system technologies and is based on the Advanced Process Control (APC) Framework. CIM (SEMI E81-0699—Provisional Specification for CIM Framework Domain Architecture) and APC (SEMI E93-0999—Provisional Specification for CIM Framework Advanced Process Control Component) specifications are publicly available from SEMI.

One illustrative aspect of the operation of the present invention will now be described. A typical process tool will normally have an acceptable operating range wherein the results of the operation of the tool produces acceptable results. Exactly how this acceptable range is defined will vary depending upon a variety of factors, e.g., the type of process tool involved, the type of integrated circuit device under construction, the type of process operation involved, etc. At various times, and for a variety of reasons, an abnormal process event or fault may occur during the operation of the process tool 12. An abnormal process event or fault is an event wherein one or more aspects of the operation of the tool are outside of a preselected acceptable range. These faults may occur with respect to some or all aspects of the operation of the process tool 12. For example, such faults or abnormal process events may be a detection that a flow rate of a particular process gas is not within allowable limits, a detection of a power surge or interruption in the electrical power supplied to the process tool 12, sensing that the temperature in the process tool 12, or change in temperature over time, is not within acceptable limits, etc. In some cases, processing operations may be continued in the process tool 12 despite the occurrence and detection of these abnormal process events or faults. In other cases, the detection of a fault may necessitate tool shut-down, e.g., a sensor may detect that a wafer is not properly positioned or secured within the tool, a detection of an absence of a particular process gas, etc.

As processing operations are performed in the process tool 12, abnormal process conditions or faults are detected by one or more of the sensors 14. Using this sensed data, a preventative maintenance program is customized for the particular process tool 12. The customization of a preventative maintenance schedule may be such as to increase or decrease the focus of a subsequent preventative maintenance plan on one or more aspects of the operation of the process tool 12. In one embodiment, the controller 16 may be used in developing the customized preventative maintenance program for the process tool 12 based upon various rules and algorithms applied by the controller 16. The controller 16 may analyze the data sensed by the sensors 14 and indicate those aspects of the operation of the process tool 12 where there have been no faults or abnormal process events for a set or preselected number of process cycles.

For example, in the case where the process tool 12 is a deposition tool, it may include functions/features such as various valves for controlling the inflow of process gases to the process tool 12, robotic means for moving wafers from station to station within the process tool 12, means for securing the wafer in position at a given location within the tool, e.g., a vacuum chuck, etc. A traditional preventative maintenance program may provide for detailed checking, cleaning and/or testing of all such functions/components of the process tool 12 during the preventative maintenance activities. However, based upon the data obtained from one or more of the sensors 14, it may be the case that performing such a detailed preventative maintenance operation on all aspects of the process tool 12 is wasteful of maintenance resources and leads to excessive down-time for the process tool 12. For example, one or more of the sensors 14 may be adapted to sense whether wafers have been properly positioned at desired locations within the process tool 12 prior to performing process operations in the process tool 12. The data collected by the sensors 14 may indicate that there has been no fault or abnormal process event associated with the movement of wafers within the process tool 12 over a given period of time of a given number of process cycles, e.g., 1–1000 process cycles. Based upon this data, it may be concluded that the wafer transport systems within the process tool 12 are very stable and unlikely to result in future faults. Thus, in this situation, it may be appropriate to eliminate or modify the preventative maintenance activities on the wafer transport system for the subject tool such that less overall time is spent in performing preventative maintenance procedures on the process tool 12. Simply put, the preventative maintenance program for the process tool 12 is dynamically designed based upon input from various sensors 14 that monitor the functions of the process tool 12.

The methods used herein may also be used to increase the concentration of preventative maintenance activities on one or more aspects of the process tool 12. For example, if the data sensed by the sensors 14 indicate that a fault or abnormal process event has occurred with respect to the power supply of the process tool 12 a number of times that is greater than a preselected acceptable number (which may be zero in some cases), then additional preventative maintenance resources may be directed toward maintenance of the power supply aspects of the process tool 12.

As another example, the sensors 14 may be positioned and configured to monitor the flow rate of various process gases, e.g., silane, nitrogen, etc., to a process tool 12. If, during the course of operating the process tool 12, an excessive number of faults or abnormal process events are associated with the flow of silane gas, but not the nitrogen gas, the preventative maintenance program may be modified accordingly. That is, the preventative maintenance program may be modified so as to increase the preventative maintenance program with respect to the variables and components that may impact the silane gas flow rate, e.g., valve cleanliness, operation, size, etc., the cleanliness of the silane gas flow lines, etc. At the same time, the preventative maintenance program may reduce the preventative maintenance activities with respect to the variables and components associated with the provision of nitrogen gas to the process tool 12. If desired, the inspection of the variables and components associated with the nitrogen gas flow supplied to the process tool 12 may be performed on a periodic basis, e.g., every third preventative maintenance cycle, as a matter of course.

The dynamic design of the preventative maintenance program may be accomplished by a variety of techniques. In one embodiment, the controller 16 may provide output as to the results of its analysis of the data obtained by the sensors 14. That is, the controller 16 applying various rules and algorithms, may identify various components or functions of the process tool 12 that may warrant increased or decreased preventative maintenance based upon the occurrence or non-occurrence of faults or abnormal process events associated with those components or functions of the process tool 12. At that time, the responsible maintenance engineer may use that information to alter a standardized preventative maintenance program in accordance with the output received from the controller 16. In another embodiment, the controller 16 may generate the customized preventative maintenance program 18 based upon its analysis of the data obtained by the sensors 14. That is, the controller 16 may be provided with various rules and algorithms that allow it to modify a pre-programmed preventative maintenance program for the subject process tool 12. In some embodiments, each particular process tool 12 may have its own unique preventative maintenance program. The evolution and changes to the preventative maintenance program for a particular process tool 12 may be stored over time and adjusted as necessary.

Through use of the present invention, the preventative maintenance program performed on a process tool may be dynamically designed based upon data obtained from a plurality of sensors that monitor the operation of the process tool 12. As a result, preventative maintenance resources may be allocated to areas of the process tool 12 that warrant further attention based upon the data obtained regarding tool operation. Additionally, tool down-time during preventative maintenance operations may be reduced or kept to a minimum as compared to prior techniques when standardized preventative maintenance procedures were performed on a process tool. As a result, manufacturing efficiencies may increase.

Figure 2:
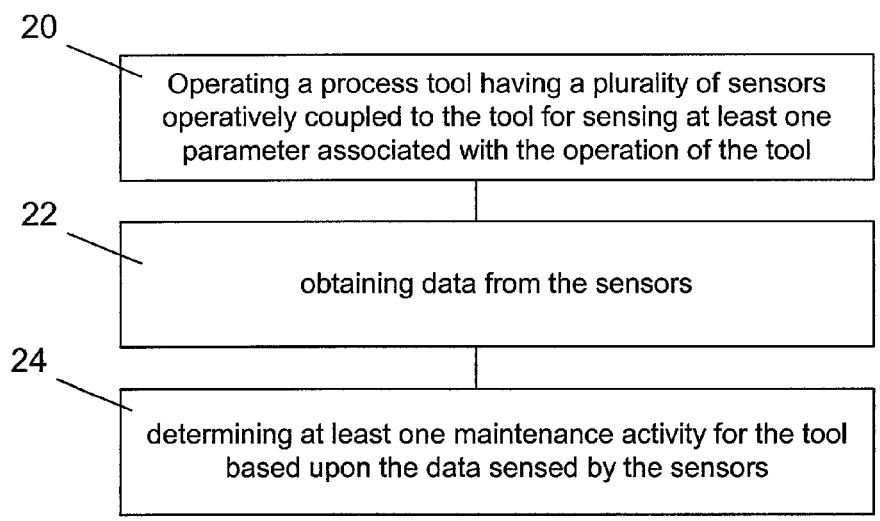
FIG. 2 depicts one illustrative embodiment of the present invention in flowchart form.

The present invention is generally directed to various methods of dynamically designing a preventative maintenance schedule based upon sensor data, and a system for accomplishing same. In one illustrative embodiment, as depicted in flow chart form in FIG. 2, the method comprises operating a process tool that has a plurality of sensors operatively coupled to the process tool for sensing at least one parameter associated with the operation of the process tool, as indicated at block 20, obtaining data from the sensors, as recited in block 22, and determining at least one maintenance activity for the process tool based upon the data sensed by the sensors, as set forth in block 24.

In another illustrative embodiment, the method comprises operating a process tool, the process tool having a plurality of sensors operatively coupled to the tool for sensing at least one parameter associated with the operation of the process tool, obtaining data from the sensors, and designing a preventative maintenance program for the process tool based upon the data obtained from the sensors. In yet another illustrative embodiment, the method comprises operating a process tool, the process tool having a plurality of sensors operatively coupled to the tool for sensing at least one parameter associated with the operation of the process tool, obtaining data from the sensors and providing the data to a controller that analyzes the data obtained from the sensors and indicates desired variations in at least one maintenance activity to be performed on the process tool based upon the analysis of the data. These variations may include increasing and/or decreasing the maintenance activities performed on various aspects of the process tool.

In yet another illustrative embodiment, the method comprises operating a process tool, the process tool having a plurality of sensors operatively coupled to the tool for sensing at least one parameter associated with the operation of the process tool, obtaining data from the sensors and providing the data to a controller that analyzes the data obtained from the sensors and identifies a plurality of maintenance activities to be performed on the process tool based upon the analysis of the data.

In another illustrative embodiment, the present invention is directed to a system that comprises a process tool adapted to perform a process operation, a plurality of sensors operatively coupled to the process tool to sense at least one parameter associated with the process operation of the process tool and a controller for analyzing data sensed by the plurality of sensors and determining at least one maintenance activity for the process tool based upon the data sensed by the sensors.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method, comprising:
operating a process tool, said process tool having a plurality of sensors operatively coupled to said tool for sensing at least one parameter associated with the operation of said process tool;
obtaining data from said sensors; and
deciding preventative maintenance procedures that are not to be performed on said process tool if said data obtained from said sensors indicates that a number of abnormal process events that occurred with respect to said aspect of said process tool exceeds an allowable limit.

2. The method of claim 1, wherein operating a process tool comprises operating at least one of a deposition tool, an etch tool, an ion implant tool, a chemical mechanical polishing tool, a furnace and a rapid thermal anneal chamber.

3. The method of claim 1, wherein said plurality of sensors are adapted to sense at least one of a temperature, a pressure, a gas flow rate, a movement of a wafer positioned in said tool, a positioning of a wafer within said tool and a cleanliness of a process chamber within said tool.

4. The method of claim 1, wherein obtaining data from said sensors comprises obtaining data from said sensors and providing it to a controller.

5. The method of claim 1, wherein each of said plurality of sensors is at least one of a temperature sensor, a pressure sensor, a gas flow rate sensor, an electrical current sensor, an electrical voltage sensor, a vacuum sensor, and an optical sensor.

6. A method, comprising:
operating a process tool, said process tool having a plurality of sensors operatively coupled to said tool for sensing at least one parameter associated with the operation of said process tool;
obtaining data from said sensors; and
designing a preventative maintenance program for said process tool based upon said data obtained from said sensors, wherein designing said preventative maintenance program comprises deciding preventative maintenance activities that are not to be performed on said tool based upon said data obtained from said sensors.

7. The method of claim 6, wherein operating a process tool comprises operating at least one of a deposition tool, an etch tool, an ion implant tool, a chemical mechanical polishing tool, a furnace and a rapid thermal anneal chamber.

8. The method of claim 6, wherein said plurality of sensors are adapted to sense at least one of a temperature, a pressure, a gas flow rate, a movement of a wafer positioned in said tool, a positioning of a wafer within said tool and a cleanliness of a process chamber within said tool.

9. The method of claim 6, wherein obtaining data from said sensors comprises obtaining data from said sensors and providing it to a controller.

10. The method of claim 6, wherein each of said plurality of sensors is at least one of a temperature sensor, a pressure sensor, a gas flow rate sensor, an electrical current sensor, an electrical voltage sensor, a vacuum sensor, and an optical sensor.

11. The method of claim 6, wherein designing said preventative maintenance program for said process tool based upon said data obtained from said sensors further comprises increasing preventative maintenance activities on an aspect of said process tool if said data obtained from said sensors indicates that the number of abnormal process events that occurred with respect to said aspect of said process tool exceeded an allowable limit.

12. The method of claim 6, wherein designing said preventative maintenance program for said process tool based upon said data obtained from said sensors further comprises decreasing preventative maintenance activities on an aspect of said process tool if said data obtained from said sensors indicates that the number of abnormal process events that occurred with respect to said aspect of said process tool is less than a preselected limit.

13. The method of claim 6, further comprising performing said designed preventative maintenance program on said process tool.

14. A method, comprising:
operating a process tool, said process tool having a plurality of sensors operatively coupled to said tool for sensing at least one parameter associated with the operation of said process tool;
obtaining data from said sensors; and
providing said data to a controller that analyzes said data obtained from said sensors and indicates at least one preventative maintenance activity that is not to be performed on said process tool based upon said analysis of said data.

15. The method of claim 14, wherein operating a process tool comprises operating at least one of a deposition tool, an etch tool, an ion implant tool, a chemical mechanical polishing tool, a furnace and a rapid thermal anneal chamber.

16. The method of claim 14, wherein said plurality of sensors are adapted to sense at least one of a temperature, a pressure, a gas flow rate, a movement of a wafer positioned in said tool, a positioning of a wafer within said tool and a cleanliness of a process chamber within said tool.

17. The method of claim 14, wherein each of said plurality of sensors is at least one of a temperature sensor, a pressure sensor, a gas flow rate sensor, an electrical current sensor, an electrical voltage sensor, a vacuum sensor, and an optical sensor.

18. The method of claim 14, further comprising performing said at least one maintenance activity on said process tool.

19. A method, comprising:
operating a process tool, said process tool having a plurality of sensors operatively coupled to said tool for sensing at least one parameter associated with the operation of said process tool;
obtaining data from said sensors; and
providing said data to a controller that analyzes said data obtained from said sensors and identifies a plurality of maintenance activities that are not to be performed on said process tool based upon said analysis of said data.

20. The method of claim 19, wherein operating a process tool comprises operating at least one of a deposition tool, an etch tool, an ion implant tool, a chemical mechanical polishing tool, a furnace and a rapid thermal anneal chamber.

21. The method of claim 19, wherein said plurality of sensors are adapted to sense at least one of a temperature, a pressure, a gas flow rate, a movement of a wafer positioned in said tool, a positioning of a wafer within said tool and a cleanliness of a process chamber within said tool.

22. The method of claim 19, wherein each of said plurality of sensors is at least one of a temperature sensor, a pressure sensor, a gas flow rate sensor, an electrical current sensor, an electrical voltage sensor, a vacuum sensor, and an optical sensor.

23. The method of claim 19, further comprising performing said identified plurality of maintenance activities on said process tool.

24. A system, comprising:
a process tool adapted to perform a process operation;
a plurality of sensors operatively coupled to said process tool to sense at least one parameter associated with the process operation of said process tool; and
a controller for analyzing data sensed by said plurality of sensors and determining at least one maintenance activity that is not to be performed on said process tool based upon said data sensed by said sensors, wherein said controller is adapted to increase at least one maintenance activity on an aspect of said process tool if said data obtained from said sensors indicates that a number of abnormal process events that occurred with respect to said aspect of said process tool exceeds an allowable limit.

25. The system of claim 24, wherein said process tool is at least one of a deposition tool, an etch tool, an ion implant tool, a chemical mechanical polishing tool, a furnace and a rapid thermal anneal chamber.

26. The system of claim 24, wherein each of said sensors is at least one of a temperature sensor, a pressure sensor, a gas flow rate sensor, an electrical current sensor, an electrical voltage sensor, a vacuum sensor, and an optical sensor.

27. The system of claim 24, wherein said controller is a stand-alone controller.

28. The system of claim 24, wherein said controller is resident on said process tool.

* * * * *